United States Patent
Van Thiel

(10) Patent No.: US 11,299,136 B2
(45) Date of Patent: Apr. 12, 2022

(54) ELECTROPNEUMATIC BRAKING SYSTEM ARCHITECTURE WITHOUT DIRECT PNEUMATIC SERVICE BRAKE REDUNDANCY ON THE REAR AXLE (1P1E)

(71) Applicant: ZF CV Systems Hannover GmbH, Hannover (DE)

(72) Inventor: Julian Van Thiel, Grossburgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 0 days.

(21) Appl. No.: 17/287,528

(22) PCT Filed: Oct. 1, 2019

(86) PCT No.: PCT/EP2019/076518
§ 371 (c)(1),
(2) Date: Apr. 22, 2021

(87) PCT Pub. No.: WO2020/083619
PCT Pub. Date: Apr. 30, 2020

(65) Prior Publication Data
US 2021/0387604 A1    Dec. 16, 2021

(30) Foreign Application Priority Data
Oct. 23, 2018    (DE) ...................... 10 2018 126 312.0

(51) Int. Cl.
*B60T 13/68*    (2006.01)
*B60T 13/38*    (2006.01)
(Continued)

(52) U.S. Cl.
CPC ............ *B60T 13/683* (2013.01); *B60T 13/38* (2013.01); *B60T 15/027* (2013.01); *B60T 15/20* (2013.01); *B60T 2270/413* (2013.01)

(58) Field of Classification Search
CPC ...... B60T 13/38; B60T 13/385; B60T 13/683; B60T 15/18; B60T 15/20; B60T 15/206;
(Continued)

(56) References Cited

U.S. PATENT DOCUMENTS

2013/0184957 A1    7/2013 Peter
2020/0079341 A1    3/2020 Van Thiel
(Continued)

FOREIGN PATENT DOCUMENTS

DE    10235707 A1    4/2004
DE    10335717 A1    3/2005
(Continued)

*Primary Examiner* — Thomas J Williams
(74) *Attorney, Agent, or Firm* — Leydig, Voit & Mayer, Ltd.

(57) ABSTRACT

A redundancy module for a pneumatic braking system of a vehicle, in particular a commercial vehicle, with spring brakes on at least one axle, includes: a parking brake pressure port for receiving a parking brake pressure; a spring brake port for providing a spring brake pressure; a redundancy pressure port for receiving a redundancy pressure; and a piston assembly, with a reverse piston having a parking brake pressure control surface, a spring brake control surface, and a redundancy pressure control surface. The parking brake pressure acting on the parking brake pressure control surface causes a control of the spring brake pressure in a same direction. The redundancy pressure acting on the redundancy pressure control surface causes an inverse control of the spring brake pressure.

16 Claims, 5 Drawing Sheets

(51) Int. Cl.
 *B60T 15/02* (2006.01)
 *B60T 15/20* (2006.01)

(58) Field of Classification Search
 CPC .......... B60T 15/246; B60T 7/20; B60T 13/26; B60T 13/261; B60T 13/263
 USPC .. 303/9.61, 9.76, 13, 14, 33, 45, 57, 68, 71, 303/80
 See application file for complete search history.

(56) References Cited

U.S. PATENT DOCUMENTS

2021/0162972 A1   6/2021  Max et al.
2021/0387604 A1*  12/2021 Van Thiel ............... B60T 15/20

FOREIGN PATENT DOCUMENTS

| DE | 102007051151 A1 | * | 11/2008 | .............. B60T 15/18 |
| DE | 102007053767 B3 | | 3/2009 | |
| DE | 102008031327 A1 | * | 4/2010 | ........... B60T 13/662 |
| DE | 102013100537 A1 | | 7/2014 | |
| DE | 102015116317 A1 | | 3/2017 | |
| DE | 102017120691 A1 | | 3/2019 | |
| EP | 0510326 A2 | | 10/1992 | |
| EP | 1953054 A1 | | 8/2008 | |
| EP | 2137036 A1 | | 12/2009 | |
| EP | 2576297 A2 | | 4/2013 | |
| GB | 2045373 A | * | 10/1980 | .............. B60T 15/18 |
| GB | 2080899 A | * | 2/1982 | .............. B60T 8/303 |
| GB | 2080899 A | | 2/1982 | |
| WO | 2018172394 A1 | | 9/2018 | |

* cited by examiner

ELECTROPNEUMATIC BRAKING SYSTEM ARCHITECTURE WITHOUT DIRECT PNEUMATIC SERVICE BRAKE REDUNDANCY ON THE REAR AXLE (1P1E)

CROSS-REFERENCE TO PRIOR APPLICATIONS

This application is a U.S. National Phase application under 35 U.S.C. § 371 of International Application No. PCT/EP2019/076518, filed on Oct. 1, 2019, and claims benefit to German Patent Application No. DE 10 2018 126 312.0, filed on Oct. 23, 2018. The International Application was published in German on Apr. 30, 2020 as WO 2020/083619 A1 under PCT Article 21(2).

FIELD

The invention relates to a redundancy module for a pneumatic braking system of a vehicle, in particular a commercial vehicle, with spring brakes on at least one axle, as well as a pneumatic braking system and a vehicle.

BACKGROUND

In electropneumatic braking systems, axle modulators are used to implement advanced braking functions and capabilities. Usually a pressure modulation is realized in that a control pressure unit provides a control pressure, which is then provided by a relay valve with boosted volume. There are also systems which have directly controllable 2/2-way valves and which directly control a volumetric pressure at the brake actuators.

In order to produce redundancy in the event of a fault in the braking system, such systems usually use two-channel control of a pneumatic pressure by means of a brake encoder. The service braking demand, which is implemented in normal operation, is provided via a first channel. A redundant pressure which is then output via a second channel on the brake encoder also represents the braking demand but is implemented by the braking system in the event of a fault.

Such a system is known from EP 1 953 054 A1, for example. There, a braking system for a commercial vehicle is revealed, which comprises at least one electronic control unit, at least a first and a second compressed air circuit, which are separated from each other, at least one parking brake cylinder, at least one parking brake valve device controllable by the electronic control unit, via which a pressure chamber of the parking brake cylinder can be ventilated or vented, and at least one service brake cylinder, to which compressed air can be delivered from the first compressed air circuit for the purpose of braking in the event of fault-free operation of the braking system. Furthermore, a switching valve is provided, which can be controlled by the electronic control unit, via which, in the event of a fault-related pressure loss in the first compressed air circuit, at least one service braking cylinder can be supplied with compressed air from the second compressed air circuit for the purpose of emergency braking, wherein the parking brake valve device is designed so that the switching state of the parking brake valve device ventilating the at least one parking brake cylinder can be maintained during the emergency braking. In this system, the service brake cylinder is used for redundancy (emergency braking), while the parking brake cylinder remains released. For this purpose, it is necessary that the switching valve releases the corresponding path, and a volume boost of a control pressure takes place. A further relay valve is therefore usually required. Furthermore, such a system cannot be implemented directly with single-channel control of a brake encoder.

Another system is known from EP 2 137 036 A1. There, a method for controlling an electronic braking system of a commercial vehicle is disclosed. The method includes the steps: detection of a defect by a first electronic control unit, which is essentially assigned to a service brake system of the commercial vehicle and/or by a second electronic control unit, which is essentially assigned to a parking brake system of the commercial vehicle, wherein the defect leads to at least partial failure of the service braking effect on an axle of the commercial vehicle. A braking demand is detected by a central electronic control unit based on the actuation of a brake encoder. An electrical signal indicating the braking demand is received by the second electronic control unit. A parking brake valve device is controlled by the second electronic control unit and the braking caused by the braking demand is supported by a spring brake cylinder of the parking braking system. The method is characterized in that the first electronic control unit and the second electronic control unit support each other functionally, so that failures of one electronic control unit can be compensated by the other electronic control unit. The method is therefore based on the idea of electronic redundancy, in which two control units are provided which can each perform functions for the other. A disadvantage here is that two electronic control units have to be provided, which can increase the cost of the braking system. There is a need to provide an inexpensive braking system, preferably using as few electronic control units as possible.

Furthermore, a method for the control of a pressure medium-operated and at least partially electronic braking system of a vehicle is known from EP 2 576 297 A1. At least one axle is pressure controlled and the other axle is electronically controlled. Control and backup pressures are generated for the wheel brakes on the at least one electronically controlled axle, wherein in the event of a failure of the electronic brake pressure control, the electronically controlled axle for this axle is generated by pressure control. The method is characterized in specific terms in that electrical signals representing the brake pressures for the wheel brakes on the pressure-controlled axle or the braking effect on the wheels of this axle are generated, and the brake pressures for wheel brakes of a trailer of the vehicle are generated at least depending on the electrical signals representing the brake pressures for the wheel brakes on the pressure-controlled axle or on the braking effect on the wheels of the pressure-controlled axle. Here it is provided that in the event that no electrical signals representing the brake pressures for the wheel brakes on the pressure-controlled axle or the braking effect on the wheels of the pressure-controlled axle can be formed, the brake pressures for the wheel brakes of the trailer are generated electropneumatically depending on the control or backup pressures for the wheel brakes of the electrically controlled axle. That is, the trailer pressure is controlled based on pressures of either the pneumatically controlled axle, such as the front axle, or the electrically controlled axle, such as the rear axle. However, there is no provision for redundancy between the front and rear axles.

SUMMARY

In an embodiment, the present invention provides a redundancy module for a pneumatic braking system of a vehicle, in particular a commercial vehicle, with spring brakes on at least one axle, comprising: a parking brake pressure port configured to receive a parking brake pressure; a spring brake port configured to provide a spring brake pressure; a redundancy pressure port configured to receive a redundancy pressure; and a piston assembly, with a reverse piston having a parking brake pressure control surface, a spring brake control surface, and a redundancy pressure control surface, wherein the parking brake pressure acting on the parking brake pressure control surface causes a control of the spring brake pressure in a same direction, and wherein the redundancy pressure acting on the redundancy pressure control surface causes an inverse control of the spring brake pressure.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
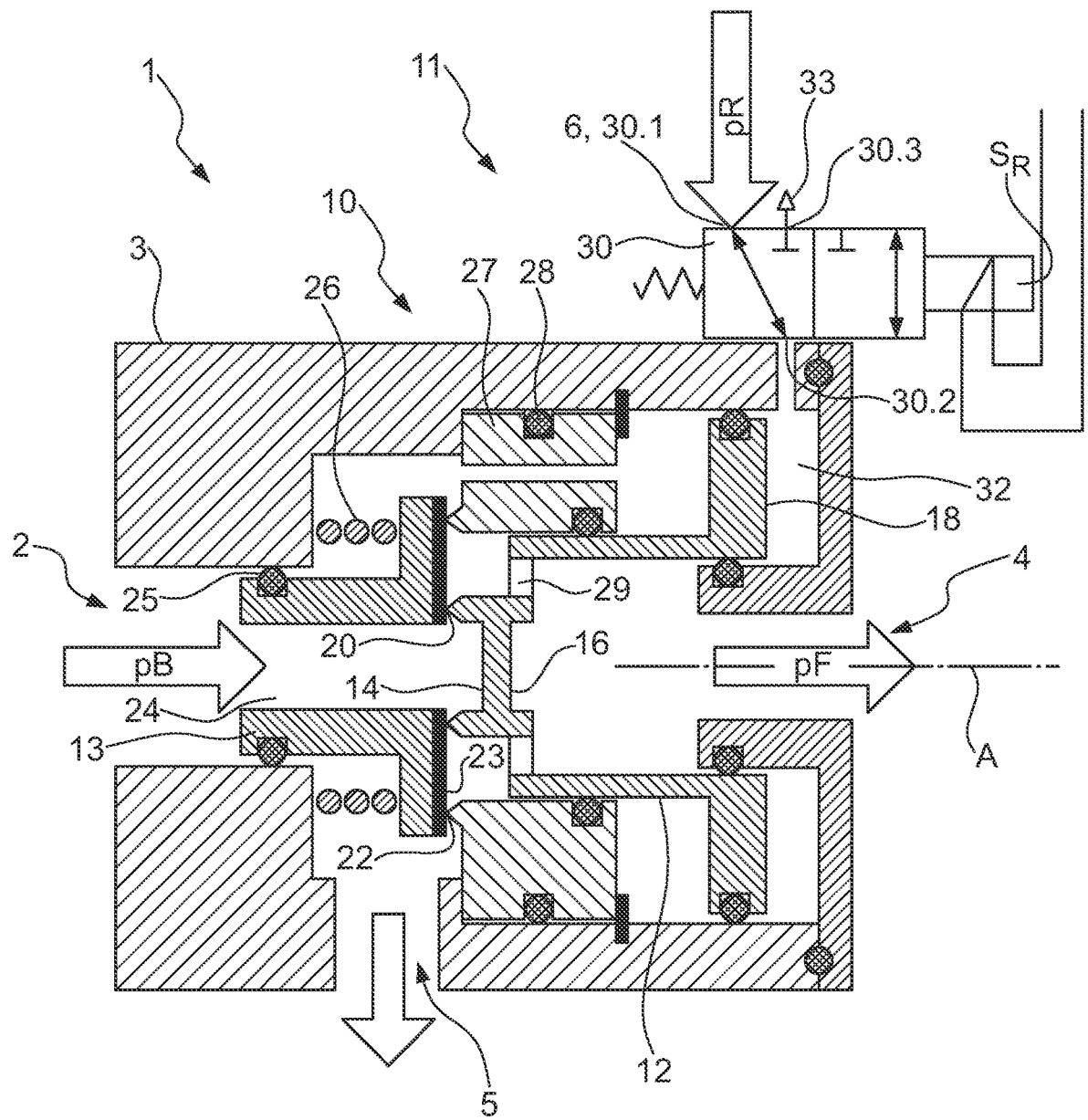
FIG. 1 shows a cross-section through a redundancy module according to a first embodiment.

In an embodiment, the present invention provides redundant braking for a braking system in which only a single pneumatic port is provided on the brake encoder. In such a braking system, it is preferably provided that brake pressures on a first axle are controlled purely pneumatically and brake pressures on a second axle are controlled electropneumatically. Redundancy on the second axle, on which the brake pressures are controlled electropneumatically, is preferably realized pneumatically.

In a first aspect, the invention solves the problem in a redundancy module of the type mentioned above with the features described herein. Such a redundancy module has a parking brake pressure port for receiving a parking brake pressure, a spring brake port for providing a spring brake pressure and a redundancy pressure port for receiving a redundancy pressure. The redundancy module also has a piston arrangement with a reverse piston, which has a parking brake pressure control surface, a spring brake pressure control surface, and a redundancy pressure control surface, wherein a parking brake pressure acting on the parking brake pressure control surface causes the control of a spring brake pressure in the same direction, and a redundancy pressure acting on the redundancy pressure control surface causes inverse control of the spring brake pressure. The parking brake pressure port is preferably connected to a parking brake module, such as an electropneumatic parking brake, and receives the parking brake pressure from this. The spring brake port is preferably connected in a corresponding manner to spring brakes of the redundantly braked axle. Spring brakes are designed in such a way that they are released by pressure and applied by venting. This means that the spring brakes are released when parking brake pressure is applied, while the spring brakes are applied when an ambient pressure is applied.

The reverse piston, which according to the invention is provided in the piston arrangement of the redundancy module, has three control surfaces, wherein these are formed in such a way that when a pressure is applied to the parking brake pressure control surface a spring brake pressure in the same direction is controlled and when a pressure is applied to the redundancy pressure control surface an inversely acting spring brake pressure is controlled. The redundancy pressure supplied to the redundancy module is thus controlled inversely, specifically to the spring brake port, in order to control the spring brakes of the corresponding axle inversely in order to use them for redundant braking or emergency braking.

In this way, purely pneumatic redundant braking of the axle equipped with spring brakes is possible without the need for electrical redundancy, for example by means of a parking brake module. A control pressure indicating a braking demand, such as a pressure of a single-channel brake encoder or a brake pressure of another axle, can be used as a redundancy pressure. There is no need for intervention in the existing service brake cylinder. It is also not necessary to provide another channel for the service brakes, but rather the one channel of the spring brakes is used for redundant braking.

In a first preferred embodiment, the reverse piston contacts a ventilation valve seat, wherein fluid flows over the ventilation valve seat when the parking brake pressure acting on the parking brake pressure control surface exceeds the spring brake pressure acting on the spring brake control surface. In the resting state, i.e. in the pressureless state, the reverse piston is preferably applied to the ventilation valve seat during pressure equilibrium and/or when a spring brake pressure exceeds the parking brake pressure.

Preferably, the piston arrangement further has a venting piston, which contacts a venting valve seat and either blocks or releases a venting port. This venting piston is preferably biased against the venting valve seat under spring loading, so that in the pressureless state the venting piston is applied to the venting valve seat and blocks the venting port. Only when, for example, the spring brake pressure exceeds the parking brake pressure does the venting piston lift off the venting valve seat and open the venting port.

In a preferred development, it is provided that the ventilation valve seat is formed on the venting piston. In this way, the ventilation valve seat can move together with the venting piston to prevent simultaneous ventilation and venting.

In a preferred development, it is provided that redundancy pressure is applied to the redundancy control surface in order to cause a flow of fluid from the spring brake port over the venting valve seat. In this way, inverse control of the redundancy pressure can be achieved. If the redundancy pressure increases, fluid can flow from the spring brake port over the venting valve seat, so that the spring brake port is consequently vented. This preferably occurs in proportion to the value of the redundancy pressure.

Preferably, the redundancy pressure is applied to the redundancy control surface to move the reverse piston together with the venting piston and to lift the venting piston off from the venting valve seat. The reverse piston thus moves based on the redundancy pressure and preferably presses the venting piston so that this detaches from the venting valve seat, so that as a result fluid can flow from the spring brake port over the venting valve seat to the venting port.

In a preferred development, the venting valve seat is arranged radially outside the ventilation valve seat. Preferably, both valve seats, the venting valve seat and the ventilation valve seat, are essentially annular. In this way, a compact design can be achieved, and a suitable arrangement of the various ports can be achieved.

In a further preferred embodiment, the redundancy module has an electropneumatic redundancy valve, with a first redundancy valve port, which forms the redundancy pressure port or is connected to it, a second redundancy valve port, which is connected to a redundancy pressure chamber, and with a third redundancy valve port, which is connected to a vent. The redundancy pressure chamber is preferably bounded by the redundancy pressure control surface, so that a pressure in the redundancy pressure chamber acts on the redundancy pressure control surface. The redundancy pressure can be blocked by the electropneumatic redundancy valve, i.e. the redundancy pressure chamber can be permanently connected to the environment, so that in this case the redundancy module can then only forward the parking brake pressure to the spring brake pressure. The parking brake pressure is usually a volumetric pressure provided directly by an electropneumatic parking braking unit.

The redundancy valve is preferably biased in a first deenergized state, in which the first redundancy valve port is connected to the second redundancy valve port and can be brought by a redundancy signal into a second state, in which the second redundancy valve port is connected to the third redundancy valve port. That is, in the energized state, the redundancy pressure chamber is preferably connected to the environment, while in the deenergized state the redundancy pressure can be fed through the redundancy valve. This takes into account the fact that a valve is usually switched to the deenergized state in the event of a fault.

Preferably, the redundancy signal is provided by a parking brake module, a central module, or a service brake. For example, if a parking brake module takes over redundant electrical control at a first fallback level, the redundancy signal can be provided by the electropneumatic parking brake module to indicate that it is still functional. Only when this is no longer functional can a pneumatic implementation of redundancy take place at a second fallback level. The central module can also be used to provide the redundancy signal. If the central module fails, a purely pneumatic redundant implementation of a driver's braking demand is then achieved directly. Finally, the service brake itself can also be used to provide the redundancy signal. This means that as long as the service brake is functional, the redundancy signal is provided. In the event that the service brake fails, no redundancy signal is provided, the redundancy valve switches, and pneumatic control can be realized by means of the spring brakes.

Furthermore, it is preferably provided that the redundancy valve and the piston arrangement are integrated in a module. This reduces the installation space and makes the module easier to install. However, there may also be embodiments in which the redundancy valve is spaced apart from the piston assembly, in particular, for example, integrated into a parking brake module or directly into a brake encoder. It is also conceivable to integrate the redundancy valve into a service brake or to integrate the redundancy module as a whole with a service brake.

In a second aspect, the aforementioned problem is solved by a pneumatic braking system for a vehicle, in particular a commercial vehicle, with a parking brake circuit and a redundancy module according to one of the above described preferred embodiments of a redundancy module according to the first aspect of the invention in the parking brake circuit. It should be understood that the redundancy module according to the first aspect of the invention and the pneumatic braking system according to the second aspect of the invention have the same and similar sub-aspects as described herein. In this respect, the above description is referred in full for particular embodiments and their advantages.

In a first preferred embodiment of the pneumatic braking system, this has an electropneumatic parking brake module with a parking brake port for providing the parking brake pressure, which is connected to the parking brake port of the redundancy module, as well as at least one spring brake, which is connected to the spring brake port of the redundancy module. The redundancy module is therefore switched between the electropneumatic parking brake module and the spring brake and forwards the parking brake pressure to the spring brakes as the spring brake pressure in normal operation. Two or more spring brakes, in particular all the spring brakes of an axle, such as in particular a rear axle or an auxiliary axle, can also be connected to the spring brake port of the redundancy module.

Furthermore, it is preferred that the pneumatic braking system has a brake encoder, which has a pneumatic brake encoder port, which is connected to the redundancy pressure port for providing the redundancy pressure. Preferably, the brake encoder has only a single pneumatic brake encoder port. The brake encoder may also have one or more, but preferably only one electrical brake encoder connection, via which the brake encoder can pass an electrical brake signal to a central module, for example.

According to a third aspect of the invention, the aforementioned object is achieved by a vehicle, in particular a commercial vehicle, with a pneumatic braking system according to one of the above described preferred embodiments of a pneumatic braking system according to the second aspect of the invention. Again, it should be understood that the vehicle according to the third aspect of the invention and the pneumatic braking system according to the second aspect of the invention have the same and similar sub-aspects as described herein. In this respect, the above description is referred to in full.

Embodiments of the invention are now described below on the basis of the drawings. These are not necessarily intended to represent the embodiments to scale, but the drawings are executed in a schematized and/or slightly distorted form where appropriate for explanation. With regard to additions to the teachings immediately recognizable from the drawings, reference is made to the relevant prior art. It must be taken into account that various modifications and changes regarding the form and detail of an embodiment can be made without deviating from the general idea of the invention. The features of the invention disclosed herein may be essential for the further development of the invention, both individually and in any combination. In addition, all combinations of at least two of the features disclosed herein fall within the scope of the invention. The general idea of the invention is not limited to the exact form or detail of the preferred embodiments shown and described below or limited to a subject matter which would be limited in comparison to the subject matter claimed in the claims. In the case of specified dimensional ranges, values within the specified limits should also be disclosed as limit values and should be usable and claimable at will. For simplicity, identical or similar parts or parts with identical or similar functions are used below with identical or similar reference characters.

Figure 2:
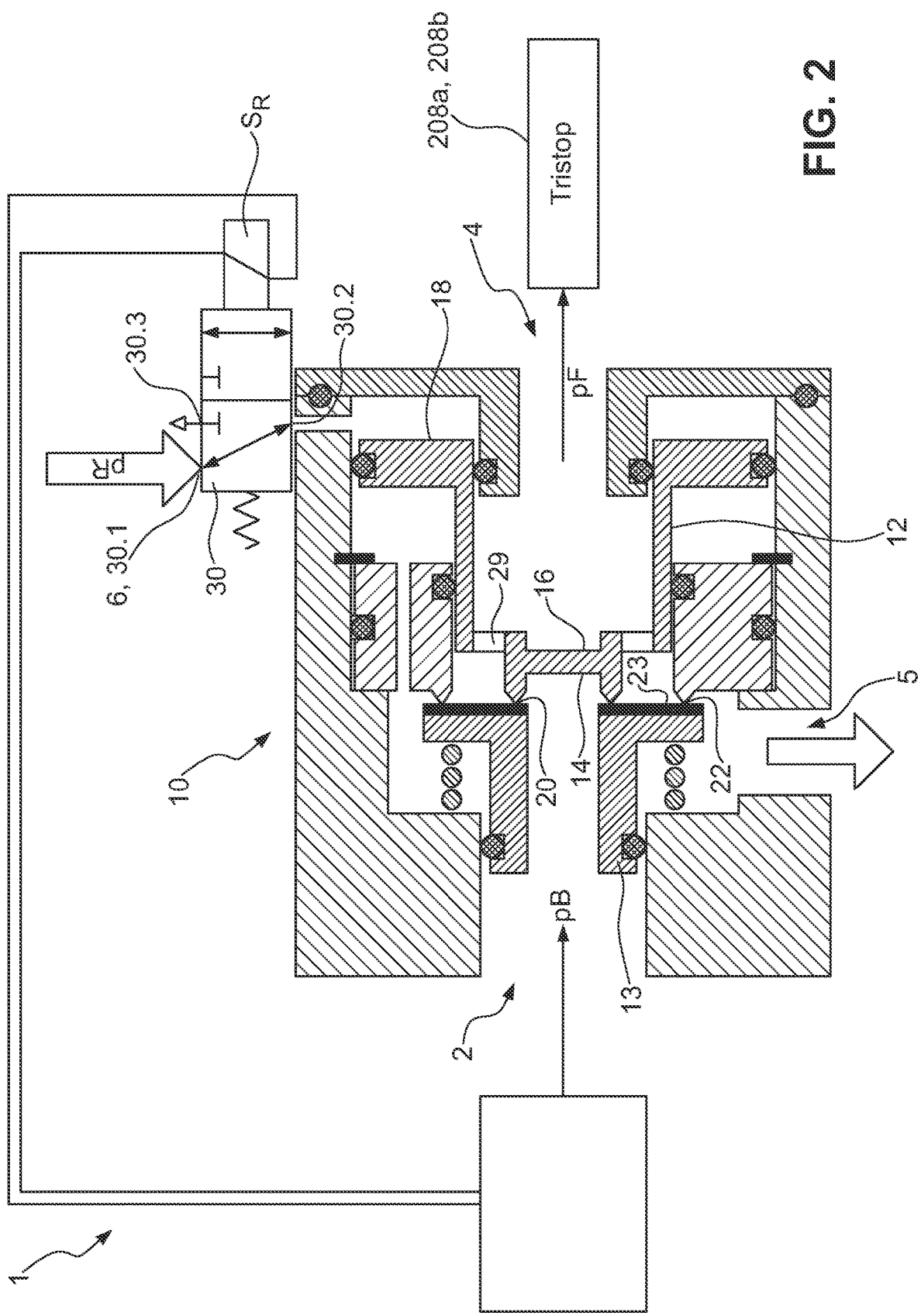
FIG. 2 shows a schematic representation of a redundancy module according to a second exemplary embodiment.
Figure 3:
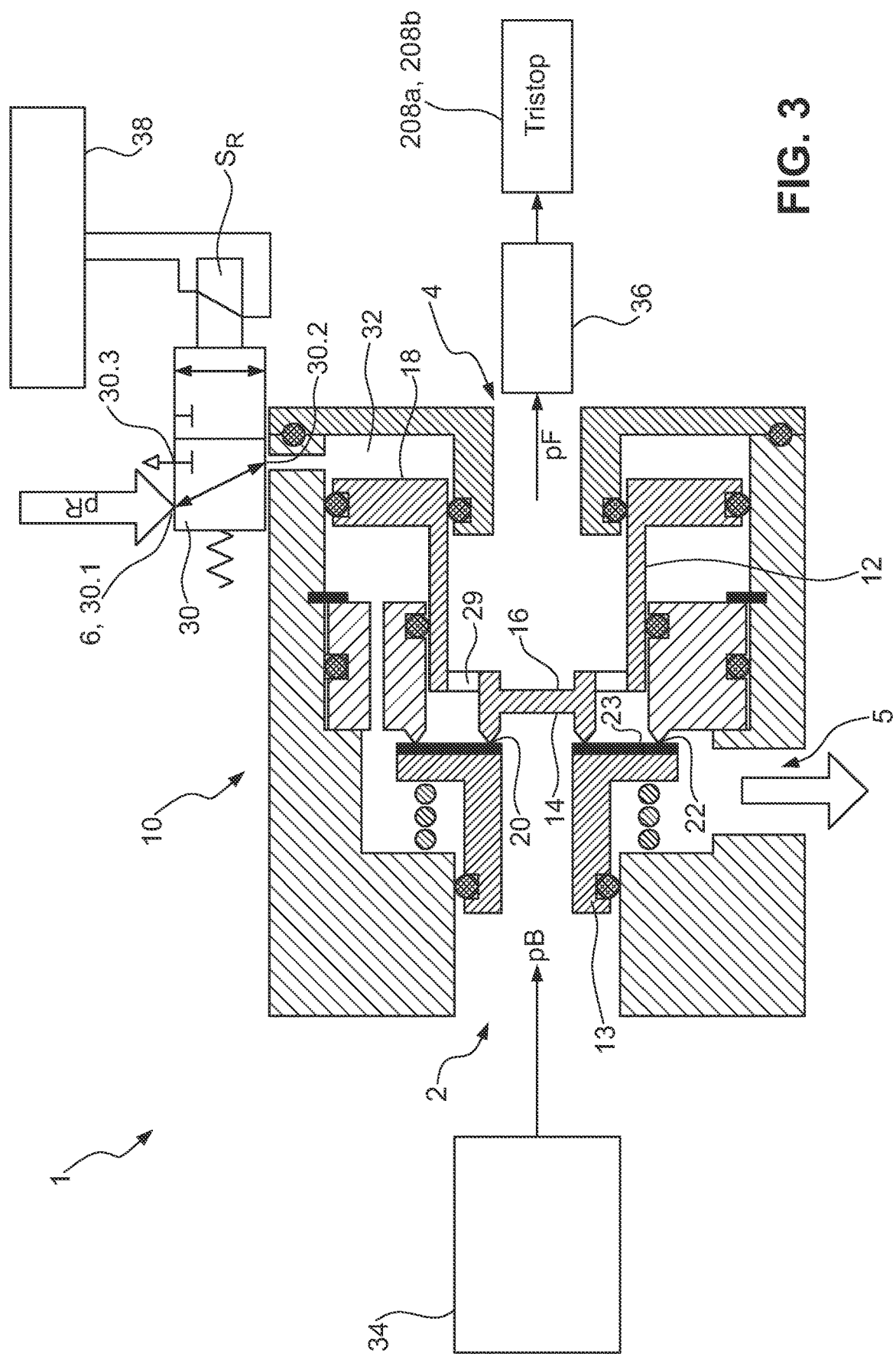
FIG. 3 shows a schematic representation of a redundancy module according to a third exemplary embodiment.
Figure 4:
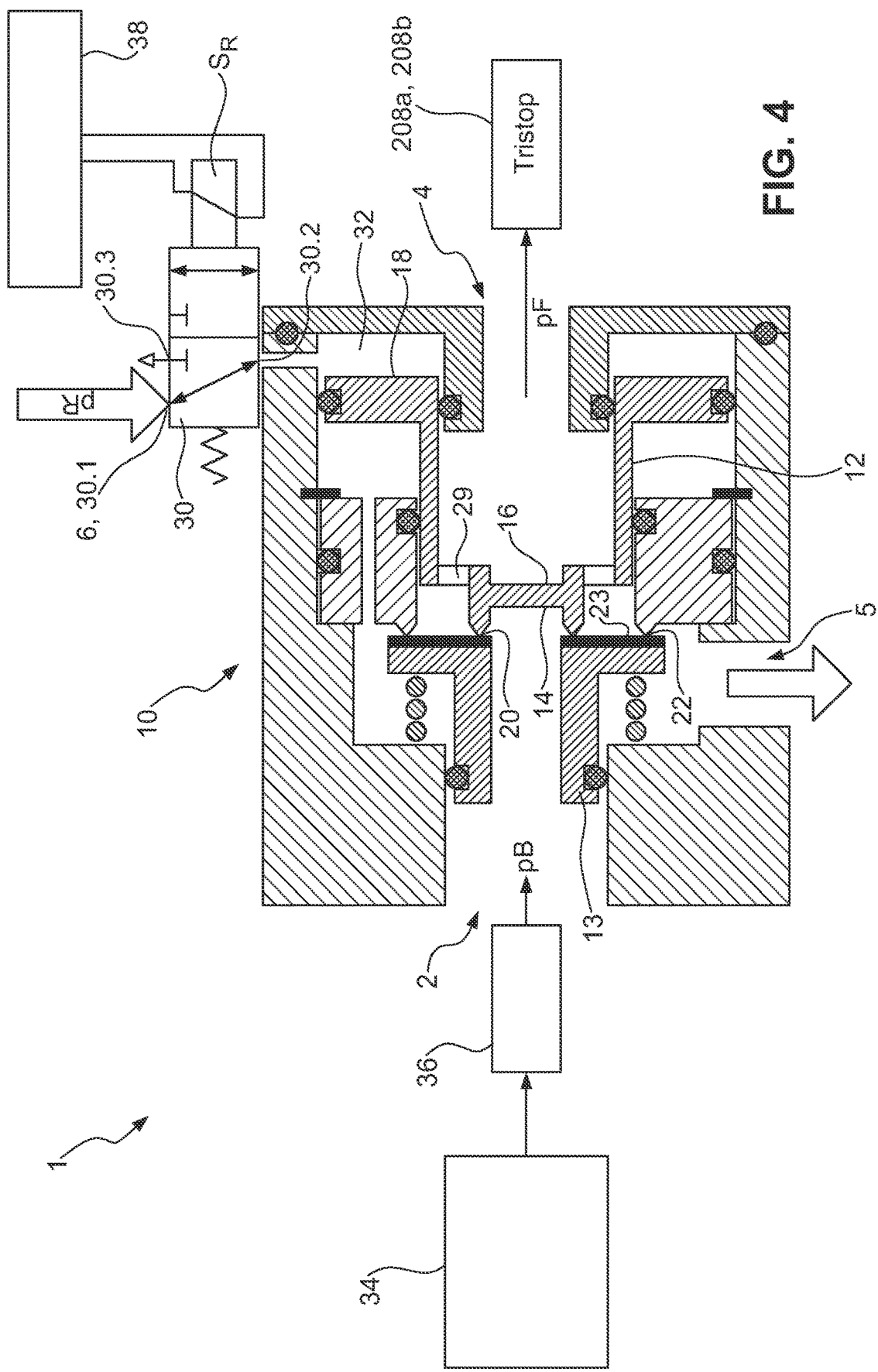
FIG. 4 shows a redundancy module according to a fourth exemplary embodiment.

FIG. 1 first shows an abstract representation of the redundancy module according to the first aspect of the invention to accurately describe individual elements and their function, while FIGS. 2 to 4 show in particular different interconnections of the redundancy module 1.

The redundancy module 1 for a pneumatic braking system 204 of a vehicle 200, namely in particular a commercial vehicle 202, has a parking brake pressure port 2 for receiving a parking brake pressure pB, which is provided in a housing 3 of the redundancy module 1. The housing 3 also has a spring brake port 4 for providing a spring brake pressure pF as well as a venting port 5 and a redundancy pressure port 6 for receiving a redundancy pressure pR. The venting port 5 can be equipped with a silencer or the like. The spring brake port 4 is preferably connected to spring brakes 208a, 208b (cf. FIG. 5) to ventilate these for normal operation and thus to release them.

Inside the housing 3 a piston assembly 10 is provided, which has a reverse piston 12 and a venting piston 13. The reverse piston 12 has a total of three control surfaces, which are assigned to the parking brake pressure port 2, the spring brake port 4 and the redundancy pressure port 6. A parking brake pressure control surface 14 is assigned to the parking brake pressure port 2, a spring brake control surface 16 is assigned to the spring brake port 4, and a redundancy pressure control surface 18 is assigned to the redundancy pressure port 6. The reverse piston 14 can be moved along the axis A and is shown in the closed position in FIG. 1. It is in contact with a ventilation valve seat 20, which is formed on the venting piston 13 in this exemplary embodiment. The venting piston 13 further defines a venting valve seat 22. For this purpose, the venting piston 13 has a sealing surface 23, which is formed on an end face. The venting piston 13 also has an axial channel 24, through which parking brake pressure pB can pass from the parking brake port 2 to the parking brake pressure control surface 14. The parking brake pressure control surface 14 is bounded by the ventilation valve seat 20.

The venting piston 13 is further sealed against the housing 3 with a first sealing ring 25 and is biased by means of a spring 26 in the closed position in which the venting port 5 is closed. In this situation, the venting piston 13 is in contact with the venting valve seat 22. This is formed between the sealing surface 23 and a fixed piston ring 27. The piston ring 27 is inserted into the housing 3 and sealed against it with a second sealing ring 28. The piston ring 27 is stationary and non-movable. It should be understood that this can also be formed in one piece with the housing 3. The piston ring 27 serves as a stop for the venting piston 13, which is pressed against the piston ring 27 by means of the spring 26. The reverse piston 12 is shown in FIG. 1 in the closed position, so that the ventilation valve seat 20 is closed.

The spring brake control surface 16 is arranged opposite the parking brake pressure control surface 14. Once the parking brake pressure pB applied to the parking brake pressure port, which acts on the parking brake pressure control surface 14, exceeds the force caused by the spring brake pressure pF applied to the spring brake port 4, which acts on the spring brake control surface 16, and a corresponding counterforce, the reverse piston 12 moves to the right along the axis A with reference to FIG. 1, so that the ventilation valve seat is opened 20. Fluid can then flow from the parking brake pressure port 2 via the ventilation valve seat 20 and through axial passages 29 (in FIG. 1 only one is provided with a reference character) in the reverse piston 12 and can pass to the spring brake port 4. In this way, the spring brake pressure pF is controlled in the same sense with the parking brake pressure pB and preferably at the same level. The parking brake pressure pB is preferably provided as a volumetric pressure, which provides a corresponding volume flow to ventilate and thus release the spring brakes 208a, 208b.

If the parking brake pressure pB decreases now because the spring brakes 208a, 208b are to be applied, the force that loads the reverse piston 12 to the left with reference to FIG. 1 exceeds the force that loads the reverse piston 12 to the right with reference to FIG. 1, so that the reverse piston 12 moves to the left with reference to FIG. 1. It also pushes the venting piston 13 to the left with reference to FIG. 1 against the force of the spring 26, so that the venting piston 13 lifts off from the venting valve seat 22 and fluid can flow from the spring brake port 4 through the axial passages 29 over the venting valve seat 22 and out of the venting port 5. The spring brakes 208a, 208b can be vented and thus applied.

In this exemplary embodiment the redundancy pressure port 6 is formed (FIG. 1) on a redundancy valve 30, which is arranged here on the housing 3, and a redundancy pressure chamber 32 is connected upstream. Alternatively, the redundancy pressure port 6 can also be directly formed on the housing 3 and thus provide direct access to the redundancy pressure chamber 32. The redundancy valve 30 is formed here as a 3/2-way valve and has a first redundancy valve port 30.1, a second redundancy valve port 30.2, and a third redundancy valve port 30.3. At the first redundancy valve port 30.1, the redundancy pressure pR is controlled by another module, as described below. The second redundancy valve port 30.2 is connected to the redundancy pressure chamber 32 and the third redundancy valve port 30.3 is connected to a vent 33. The redundancy valve 30 is deenergized in the first switching position shown in FIG. 1, in which the first redundancy valve port 30.1 is connected to the second redundancy valve port 30.2. By providing a redundancy signal SR, the redundancy valve 30 is energized and switches to the second switching position which is not shown in FIG. 1. In the second switching position, which is not shown in FIG. 1, the second redundancy valve port 30.2 is connected to the third redundancy valve port 30.3, so that the redundancy pressure chamber 32 is vented.

The redundancy pressure chamber 32 is bounded on the one side by the housing 3 and on the other side by the redundancy pressure control surface 18. If a redundancy pressure pR is now controlled in the redundancy pressure chamber 32, for example in the case in which control of a service brake pressure by means of service brakes is not possible, the pressure in the redundancy pressure chamber 32 increases, so that with a suitable pressure ratio the reverse piston 12 is moved to the left with respect to FIG. 1. This in turn moves the venting piston 13 to the left, so that the venting valve seat 22 is opened and fluid can flow from the spring brake port 4 to the vent 5. In accordance with this, the spring brakes 208a, 208b connected to the spring brake port 4 are vented and applied. That is, the control of a redundancy pressure pR in the redundancy pressure chamber 32 leads to inverse control of the spring brake pressure pF and thus to a braking effect on the corresponding axle.

A first variant of the interconnection of the redundancy module 1 is shown schematically in FIG. 2. The parking brake pressure pB is provided here by an electropneumatic parking brake module EPH, which is connected to the parking brake pressure port 2. The spring brake port 4 is connected to so-called tristop brake actuators, which also include a spring brake part 208a, 208b. The redundancy signal SR is provided by the parking brake module EPH. In such a circuit, for example, at a first redundancy level the parking brake module EPH can perform the redundant braking of a corresponding axle by replacing service brake parts of the tristop brake actuators with a corresponding control of the spring brakes 208a, 208b. Should the parking brake module EPH fail and become deenergized in a further fault or in a different fault, the redundancy signal SR would also be eliminated, so that the redundancy valve 30 reverts to the first switching position shown in FIG. 2 and the redundancy pressure port 6 is opened. By controlling redundancy pressure pR at the redundancy pressure port 6, braking of the corresponding axle can then be carried out.

FIG. 3 shows a second variant of the interconnection, in which a pneumatic parking brake 34 is provided. In this example (FIG. 3), the pneumatic parking brake 34 provides the parking brake pressure pB at the parking brake pressure port 2. The spring brake pressure pF is initially provided to a parking brake relay valve 36, which then in turn provides the spring brake pressure at the corresponding spring brakes 208a, 208b.

The redundancy signal SR is provided in this exemplary embodiment by a service brake unit 38, for example a sensor that is provided on a service brake, or a unit upstream of the service brake. The redundancy signal SR indicates the operational readiness of the service brake in this case. Thus, if the service brake fails, the redundancy signal SR issued by the service brake unit 38 also fails, so that the redundancy valve 30 reverts to the first switching position shown in FIG. 3. The control of the redundancy pressure pR in the redundancy pressure chamber 32 is enabled, and redundant and inverse control of the spring brake pressure pF and thus application of the spring brakes 208a, 208b is possible.

The exemplary embodiment shown in FIG. 4 essentially corresponds to the one shown in FIG. 3, wherein the parking brake relay valve 36 is switched between the pneumatic parking brake 34 and the parking brake pressure port 2. In this exemplary embodiment, the spring brake port 4 is directly connected to the spring brakes 208a, 208b of the tristop brake actuators.

Figure 5:
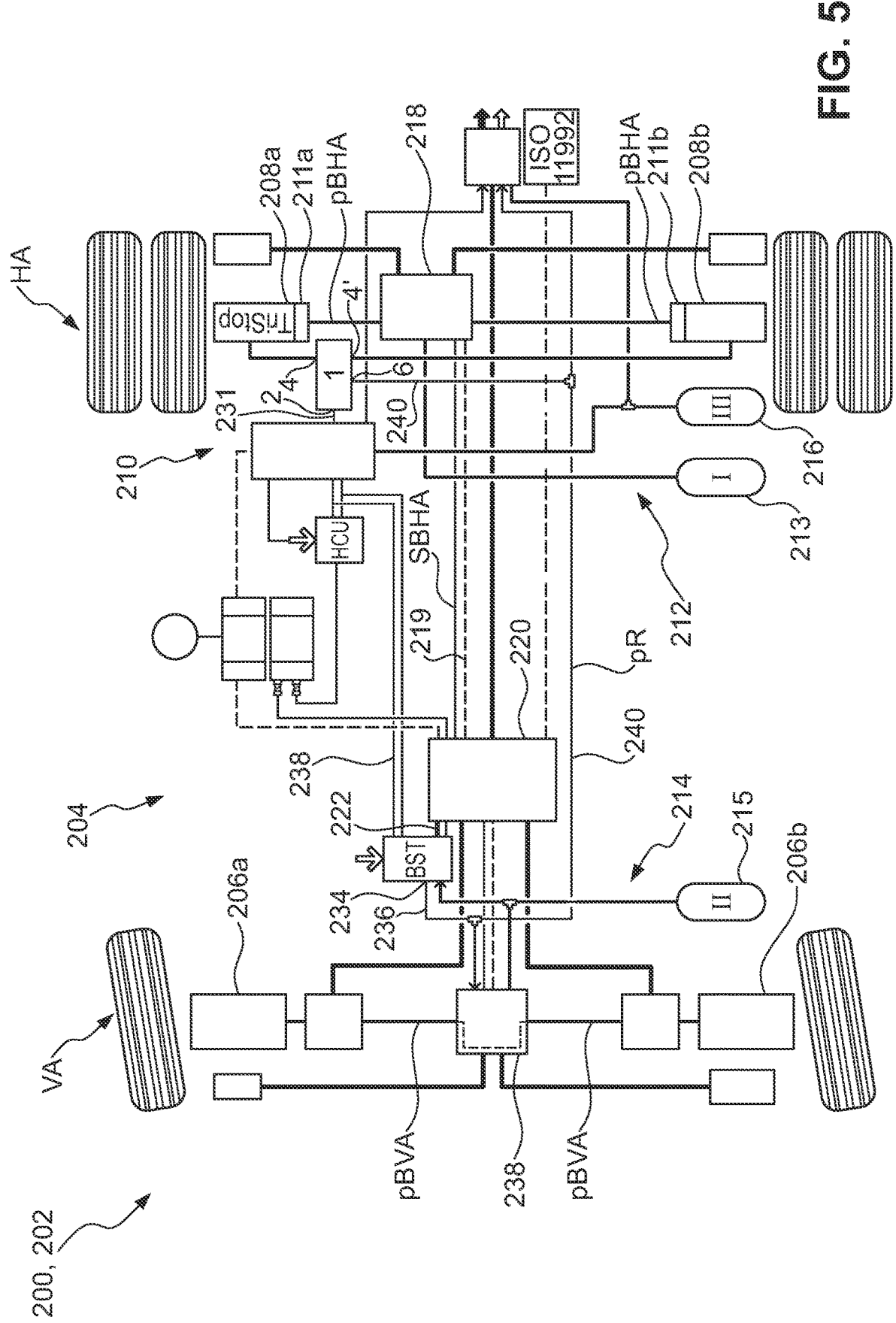
FIG. 5 shows a layout of a braking system according to the second aspect of the invention, installed in a vehicle according to the third aspect of the invention.

FIG. 5 now shows a schematic overview of a pneumatic braking system 204, which is used in a vehicle 200, namely a commercial vehicle 202. The vehicle 202 has a front axle VA and a rear axle HA. The pneumatic braking system 204 has first and second service brakes 206a, 206b on the front axle VA and first and second spring brakes 208a, 208b on the rear axle HA, which are provided in so-called tristop brake actuators. Third and fourth service brakes 211a, 211b are also provided for the rear axle HA to implement a service braking demand on the rear axle HA. The brake system 204 has in total a three-circuit structure and has a rear axle service brake circuit 212, which is supplied from a first compressed air supply 213, a front axle service brake circuit 214, which is supplied from a second compressed air supply 215, and a parking brake circuit 210, which is supplied from a third compressed air supply 216. The rear axle service brake circuit 212 is initially connected to a rear axle modulator 218, which receives rear axle braking signals SBHA via a first BUS 219 from a central module 220 and controls corresponding brake pressures pBHA at the third and fourth service brakes 211a, 211b of the rear axle HA. The central module 220 in turn receives the service braking demand from a brake encoder BST via an electrical brake encoder line 222. The brake encoder BST also has a pneumatic port 234, which is connected to a pneumatic brake encoder line 236. The brake encoder BST is designed here as a so-called 1p2e brake encoder and in addition to the connection to the electrical brake encoder line 222 also has a further electrical brake encoder line 238, which is connected to the electro-pneumatic parking brake module EPH. A first redundancy level can be formed by this means if necessary.

The parking brake module EPH is connected to the redundancy module 1, as has already been described in principle with reference to FIG. 2. More specifically, a parking brake port 231 of the EPH is connected to the parking brake pressure port 2 of the redundancy module 1, so that the parking brake module EPH can provide the parking brake pressure pB at the parking brake pressure port 2. In the exemplary embodiment shown in FIG. 5, in addition to the spring brake port 4 the redundancy module 1 has a further spring brake port 4', to which each of the spring brakes 208a, 208b is connected. The functionality here is as already described with reference to FIGS. 1 to 4.

The pneumatic brake encoder line 236 leads to a front axle modulator 238 in the front axle service brake circuit 214. The front axle modulator 238 is purely pneumatically designed and pneumatically controls a front axle brake pressure pBVA at the first and second service brakes 206a, 206b. From the pneumatic brake encoder line 236, a redundancy pressure line 240 also leads to the redundancy module 1 and is connected there to the redundancy pressure port 6. This means that the pressure pneumatically controlled by the brake encoder BST is used on the one hand to control the front axle brake pressure pBVA, which is controlled in operation, and on the other hand as a redundancy pressure pR, which is provided at the redundancy pressure port 6.

If, in the event of a fault, wherein the central module 220, the parking brake module EPH or the rear axle modulator 218 fails, redundant braking of the rear axle HA by the spring brakes 208a, 208b can be caused by providing the pneumatic pressure controlled by the brake encoder BST as a redundancy pressure pR at the redundancy pressure port 6 in order to achieve inverse control of the spring brake pressure pF at the spring brakes 208a, 208b in order to brake the HA rear axle redundantly in this way.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE CHARACTER LIST (PART OF THE DESCRIPTION)

1 Redundancy module
2 Parking brake pressure port
3 Housing
4, 4' Spring brake port
5 Venting port
6 Redundancy pressure port
10 Piston arrangement
12 Reverse piston
13 Venting piston
14 Parking brake pressure control surface
16 Spring brake control surface
18 Redundancy pressure control surface
20 Ventilation valve seat
22 Venting valve seat
23 Seal surface
24 Axial channel
25 First sealing ring
26 Spring
27 Piston ring
28 Second sealing ring
29 Axial passages in the reverse piston
30 Redundancy valve
30.1 First redundancy valve port
30.2 Second redundancy valve port
30.3 Third redundancy valve port
32 Redundancy pressure chamber
34 Pneumatic parking brake
36 Parking Brake RV
38 Service brake unit
200 Vehicle
202 Commercial vehicle
204 Pneumatic braking system
206a, 206b First and second service brakes
208a, 208b First and second spring brakes
210 Parking brake circuit
211a, 211b Third and fourth service brakes
212 Front axle brake circuit
213 First compressed air supply
214 Rear axle brake circuit
215 Second compressed air supply
216 Third compressed air supply
218 Rear axle modulator
219 First BUS
220 Central module
222 Electrical brake encoder line
231 Parking brake port
234 Pneumatic brake encoder port
236 Pneumatic brake encoder line
238 Front axle modulator
240 Redundancy pressure line
VA Front axle
HA Rear axle
BST Brake encoder
EPH Electropneumatic parking brake module
pB Parking brake pressure
pBHA Rear axle brake pressure
pBVA Front axle brake pressure
pF Spring brake pressure
pR Redundancy pressure
SR Redundancy signal
SBHA Rear axle braking signal

The invention claimed is:

1. A redundancy module for a pneumatic braking system of a vehicle, in particular a commercial vehicle, with spring brakes on at least one axle, comprising:
a parking brake pressure port configured to receive a force exerted by a parking brake pressure exerted in a first direction;
a spring brake port configured to provide a force exerted by a spring brake pressure in the first direction;
a redundancy pressure port configured to receive a redundancy pressure; and
a piston assembly, with a reverse piston having a parking brake pressure control surface, a spring brake control surface, and a redundancy pressure control surface,
wherein the parking brake pressure acting on the parking brake pressure control surface causes a control of the spring brake pressure, and
wherein the redundancy pressure acting on the redundancy pressure control surface causes an inverse control of the spring brake pressure.

2. The redundancy module of claim 1, wherein the reverse piston is configured to contact a ventilation valve seat, and wherein fluid flows over the ventilation valve seat when the parking brake pressure acting on the parking brake pressure control surface exceeds the spring brake pressure acting on the spring brake control surface.

3. The redundancy module of claim 1, further comprising:
a venting piston configured to contact a venting valve seat and either block or release a venting port.

4. The redundancy module of claim 3, wherein the venting piston is biased against the venting valve seat by spring loading.

5. The redundancy module of claim 3, wherein a ventilation valve seat is formed on the venting piston.

6. The redundancy module of claim 5, wherein the redundancy pressure is applicable to the redundancy control surface to cause a flow of fluid from the spring brake port over the venting valve seat.

7. The redundancy module of claim 5, wherein the redundancy pressure is applicable to the redundancy control surface in order to move the reverse piston together with the venting piston and to lift the venting piston off from the venting valve seat.

8. The redundancy module of claim 5, wherein the venting valve seat is arranged radially outside the ventilation valve seat.

9. The redundancy module of claim 1, further comprising:
an electropneumatic redundancy valve with a first redundancy valve port forming or connected to the redundancy pressure port, a second redundancy valve port connected to a redundancy pressure chamber, and with a third redundancy valve port connected to a vent.

10. The redundancy module of claim 9, wherein the redundancy valve is biased in a first deenergized state, in which the first redundancy valve port is connected to the second redundancy valve port and is transferrable by a redundancy signal to a second state, in which the second redundancy valve port is connected to the third redundancy valve port.

11. The redundancy module of claim 10, wherein the redundancy signal is provided by a parking brake module, a central module, or a service brake.

12. The redundancy module of claim 10, wherein the redundancy valve and the piston assembly are integrated in a module.

13. A pneumatic braking system for a vehicle, in particular a commercial vehicle, comprising:
- a parking brake circuit; and
- the redundancy module of claim 1 in the parking brake circuit.

14. The pneumatic braking system of claim 13, further comprising:
- an electropneumatic parking brake module with a parking brake port configured to provide the parking brake pressure, which is connected to the parking brake port; and
- at least one spring brake which is connected to the spring brake port.

15. The pneumatic braking system of claim 13, further comprising:
- a brake encoder with a pneumatic brake encoder port which is connected to the redundancy pressure port so as to provide the redundancy pressure.

16. A vehicle, in particular a commercial vehicle, comprising:
- the pneumatic braking system of claim 13.

\* \* \* \* \*